(12) United States Patent
Peng et al.

(10) Patent No.: US 8,720,617 B2
(45) Date of Patent: May 13, 2014

(54) ELECTRIC BUS

(75) Inventors: Wang Peng, Guangdong (CN); Weiye Lin, Guangdong (CN); Lecheng Liang, Guangdong (CN); Kui Jing, Guangdong (CN)

(73) Assignees: Shenzhen BYD Auto R&D Company Limited, Shenzhen, Guangdong (CN); BYD Company Limited, Shenzhen, Guangdong (CN)

( * ) Notice: Subject to any disclaimer, the term of this patent is extended or adjusted under 35 U.S.C. 154(b) by 33 days.

(21) Appl. No.: 13/536,725

(22) Filed: Jun. 28, 2012

(65) Prior Publication Data

US 2013/0000997 A1 Jan. 3, 2013

(30) Foreign Application Priority Data

Jun. 28, 2011 (CN) ...................... 2011 2 0221924 U

(51) Int. Cl.
*B60S 5/06* (2006.01)
(52) U.S. Cl.
USPC ........................... 180/65.1; 180/68.5; 903/907
(58) Field of Classification Search
USPC .......................... 180/65.1, 68.5; 903/903, 907
See application file for complete search history.

(56) References Cited

U.S. PATENT DOCUMENTS

| 8,146,694 | B2 * | 4/2012 | Hamidi ......................... 180/68.5 |
| 8,400,106 | B2 * | 3/2013 | Midrouillet et al. ........... 320/109 |
| 8,453,773 | B2 * | 6/2013 | Hill et al. .................... 180/65.29 |
| 8,511,237 | B2 * | 8/2013 | Morita et al. .................... 105/51 |
| 2006/0237242 | A1 * | 10/2006 | Burke ............................... 180/23 |
| 2012/0186888 | A1 * | 7/2012 | Ross ............................ 180/65.31 |
| 2013/0153315 | A1 * | 6/2013 | Yu et al. ........................ 180/68.5 |

* cited by examiner

*Primary Examiner* — John Walters
(74) *Attorney, Agent, or Firm* — Finnegan, Henderson, Farabow, Garrett & Dunner, LLP

(57) ABSTRACT

An electric bus is disclosed, comprising a body including a floor, a rear cabin, and two front wheel wells. The front wheel wells are disposed in a middle section of the body. The body further includes a seat area having one or more seats arranged in one or more rows. The rear cabin is disposed behind a back row of the seats. The electric bus further includes a chassis and a battery system for providing electric power to the electric bus. The battery system further comprises a first battery group disposed above the respective front wheel wells; a second battery group disposed under the floor and proximate to an intermediate row of the seats; and a third battery group disposed under the floor and proximate to a back row of the seats and in the rear cabin behind the back row of seats.

20 Claims, 2 Drawing Sheets

US 8,720,617 B2

ELECTRIC BUS

CROSS-REFERENCE TO RELATED APPLICATION

This application claims priority to and the benefits of Chinese Patent Application No. 201120221924.6 filed with the State Intellectual Property Office of P. R. China on Jun. 28, 2011, which is incorporated herein by reference in its entirety.

FIELD

The present disclosure is related to an electric bus.

BACKGROUND

Conventional electric buses mainly use a two-step stair structure to allow passengers to access a main floor of a passenger compartment. However, due to passenger traffics, the two-step stair structure causes inconveniences to the passengers as well as reduces the operating time of the vehicles. For these reasons, a one-step stair structure is generally used to lower the main floor in the passenger compartment. However, because the battery packs occupies a significant amount of interior space, the arrangement of the battery packs in a bus with a low floor may be difficult. As a result, conventional low-floor electric buses generally use a battery cabinet installed towards the rear end of the passenger compartment, causing imbalanced axle loads and instability. The uneven distribution of axle load may further influence the performance of the electric bus.

SUMMARY

According to one embodiment, an electric bus is disclosed. The electric bus comprises a body including a floor, a rear cabin, and two front wheel wells. The front wheel wells are disposed in a middle section of the body. The body further includes a seat area having one or more seats arranged in one or more rows. The rear cabin is disposed behind a back row of the seats. The electric bus further includes a chassis and a battery system for providing electric power to the electric bus. The battery system further comprises a first battery group disposed above the respective front wheel wells; a second battery group disposed under the floor and proximate to an intermediate row of the seats; and a third battery group disposed under the floor and proximate to a back row of the seats and in the rear cabin behind the back row of seats.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of the disclosure will become apparent and more readily appreciated from the following descriptions taken in conjunction with the drawings in which.

DETAILED DESCRIPTION

Figure 1:
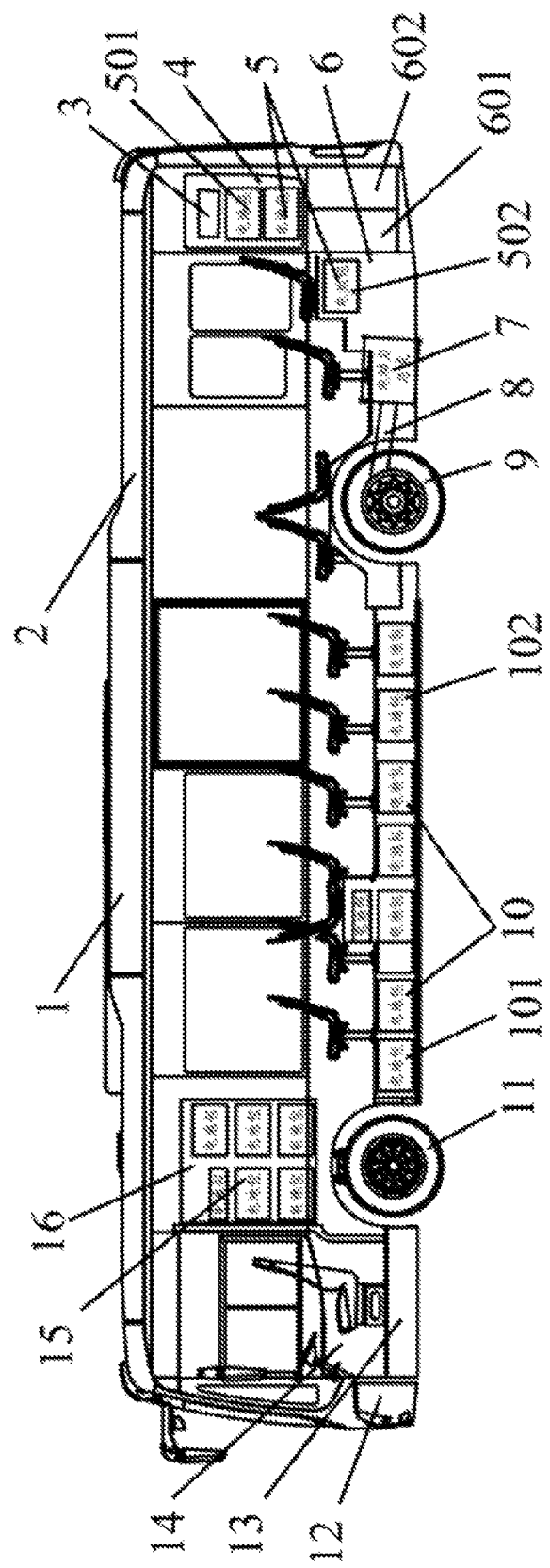
FIG. 1 is a see-through side view of an electric bus according to an embodiment.

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

Figure 2:
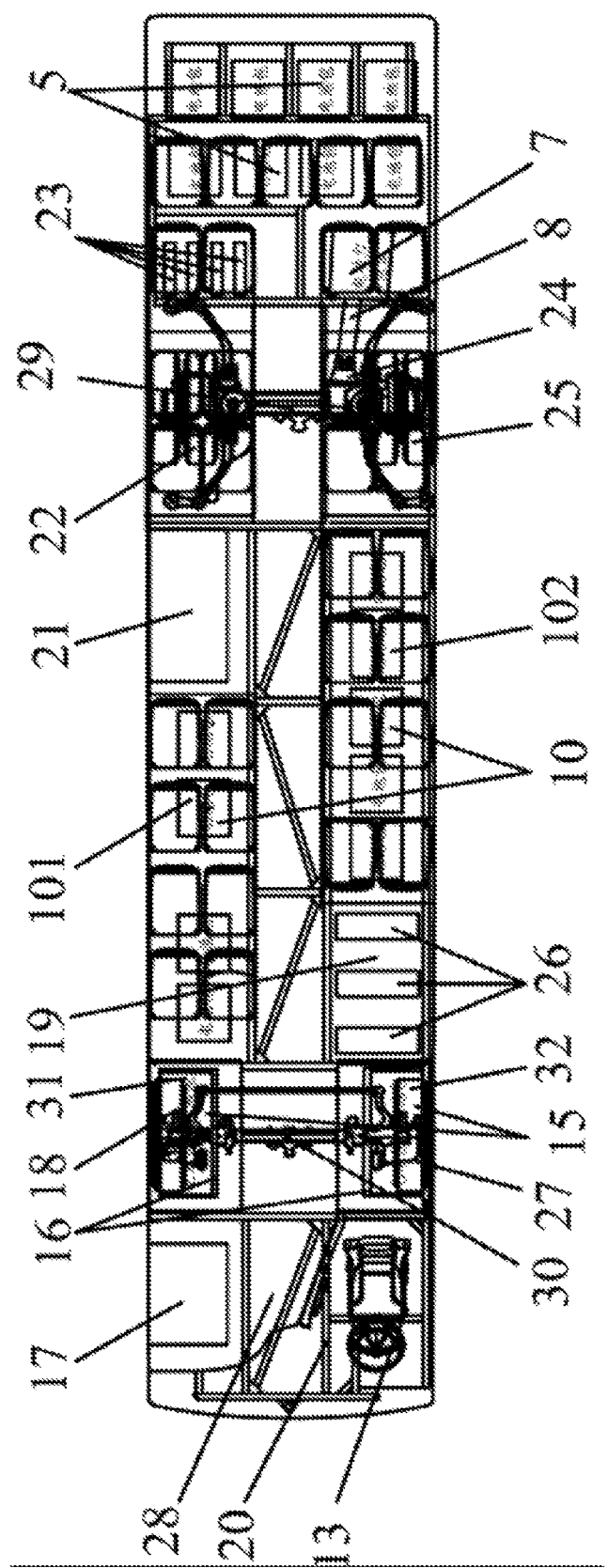
FIG. 2 is a see-through top view of the electric bus shown in FIG. 1.

In the description of the present invention, the words "center," "vertical," "upper," "down," "front," "rear," "left," "right," "vertical," "behind," "top," "bottom," "inner," and "external," etc., indicate the orientations and position relationships based on the normal position of the electric bus shown in FIGS. 1 and 2, which are only used for convenience to describe the embodiments, but not to indicate the apparatus or components having specific orientations, specific orientation structures and operations. Thus, these should not be considered as limitations to the present invention. The features marked as "first," "second," etc., may explicitly or implicitly indicate one or more features included therein. In the description of the present disclosure, "multiple" means two or more.

As shown in FIGS. 1 and 2, an electric bus comprises a body 2, a chassis 20, an electric power assembly 7 arranged on one side of the electric bus across from the passenger door 21 and behind the rear axle 29 of the chassis 20, an electric-hydraulic power steering system 13 arranged under section 14 of the main floor of the body 2, and an air conditioning system 1 arranged at the central section of a top cover of the body 2. A wheelchair area 19 is arranged behind a front wheel well 27 and at the side of the body 2 across from the front passenger door 17 of the body 2. The wheelchair area 19 is arranged for disabled passengers. The electric bus further comprises a battery system disposed respectively in a middle section of the body 2, under a floor 28 of the body 2, and in a rear cabin of the body 2. The battery system comprises a first battery group 15 disposed above the front wheel wells 18 and 27 in the middle section of the body 2, a second battery group 10 disposed under the floor of an intermediate row seat area of the body 2, and a third battery group 5 disposed under the floor of the back row seat area of the body 2 and in a rear cabin behind the back row seat of the body 2. The distribution of the battery system may effectively lower the center of gravity of the electric bus.

Furthermore, with reference to FIGS. 1 and 2, a battery assembly cabinet 16 is arranged above each of front wheel wells 18 and 27. The battery assembly cabinets 16 are disposed symmetrically with respect to a longitudinal centre line of the body 2. The battery assembly cabinets 16 include therein a first battery group 15. Specifically, the first battery group 15 includes a first set of battery packs 31 and second set of battery packs 32 secured in the respective battery assembling cabinets 16 via brackets. The first set of battery packs 31 and second set of battery packs 32 are vertically stacked in the respective battery assembling cabinets 16. As such, the first battery group 15 may be inspected and repaired by opening the battery assembling cabinets 16 from within the electric bus.

The second battery group 10 comprises a third set of battery packs 101 and fourth set of battery packs 102. The third set of battery packs 101 and the fourth set of battery packs 102 are secured via brackets to the chassis 20 under the floor of the intermediate rows of seats of the body 2. The third set of battery packs 101 are disposed under the floor of the seat area which is between the front wheel cap 18 near the passenger door 17 of the body 2 and a rear passenger door 21. The third set of battery packs 101 form a single layer on the chassis 20. The fourth set of battery packs 102 includes battery packs between the front wheel well 27 and rear wheel well 25. The battery packs under the wheelchair area 19 may be arranged in two layers. The battery packs in the other areas may be arranged in a single layer. Also, the second battery group 10 may be inspected and repaired by opening the floor 28 from within the electric bus.

The third battery group 5 includes a fifth set of battery packs 502 and a sixth set of battery packs 501. The fifth set of battery packs 502 are secured to a bottom section of the rear cabin 6 under the floor of the back row seat area of the body 2. And the fifth set of battery packs 502 form a single layer under the floor of the back row seat area of the body 2. The sixth set of battery packs 501 are fixed via brackets to the top of the rear cabin 4 behind the back row seat area of the body 2. And the sixth set of battery packs 501 are stacked vertically. As a result, the third battery group 5 may be inspected and repaired by opening the back panel from within the electric bus. The distribution of the three battery groups may effectively lower the center of gravity of the vehicle, reduce the possibility of tipping, and greatly improve the stability of the entire vehicle.

A high-voltage power distribution system 3 is secured through a bracket to the top of the sixth battery packs 501 of the third battery group 5 behind the back row seat area of the body 2. A service switch is disposed on the upper side of the sixth battery pack 501 of the third battery pack 5. Thus, the high-pressure power distribution system 3 may be inspected and repaired by opening the back panel inside the electric bus. The configuration may effectively prevent collision and water damages, thereby improving safety.

The numbers of the battery packs in the first battery group 15, the second battery group 10, and the third battery group 5 are substantially similar. According to one embodiment, each battery group has 21 battery packs to achieve balanced axle loads of the front and rear axles. A power and temperature management unit is disposed near each battery group. According to an embodiment, the power and temperature management unit is disposed at a location leading to substantially the shortest wire line to each of the battery packs in the respective battery group. A negative terminal protecting device is disposed at the negative terminal of each battery group. The negative terminal protecting device is used to protect the negative terminal of the battery group and its associated circuits. Each battery group is enclosed and sealed in a cover structure for waterproof and dustproof.

As shown in FIGS. 1 and 2, the electric power assembly 7 comprises a driving motor and an auto-transmission that are secured to the chassis 20 across from the side having the passenger door 21 and behind the rear axis 29. The electric power assembly 7 is connected to the input shaft of the main gearbox 24 of the rear axle 29 via a transmission shaft 8. In addition, the electric power assembly 7 is located on the left side of the centerline of the chassis 20, thereby lowering the height of the main floor.

According to an embodiment, an electric control system is set at the bottom of the rear cabin 6 near an inner cabin 601 of the fifth set of battery packs 502. The electric control system includes a transmission controller, a rear cabin assistance controller, a steering driving motor controller, an electric air compressor controller, and a driving motor controller, which are installed from left to right in the inner cabin 601. The electric control system may control the operation of the entire electric bus. In addition, an outer cabin 602 is disposed at a lower section of the rear cabin 6 of the body 2. The outer cabin 602 includes therein from left to right a hydraulic steering pump with the associated driving motor, a water tank for a heating system, an electric air compressor, a low pressure switch, a DC-DC converter, a low-voltage power supply, a rear cabin low-voltage distribution box, and a radiator. Installing the steering pump and the driving motor in the rear cabin may reduce noises within the entire electric bus. The electric air compressor may provide compressed air to the power braking system and the power door system. According to a further embodiment, the power braking system and the power door system may include two independent circuits to provide failover protection.

The chassis 20 of the electric bus further comprises a first air tank group 26 and a second air tank group 23. The first air tank group 26 is secured via brackets to the chassis 20 under the floor of the wheelchair area 19. The second air tank group 23 is secured via brackets to the chassis 20 on the side of the passenger door 21 and behind the rear wheel well 22. The first air tank group 26 and the second air tank group 23 are arranged in a single-layer structure. The first air tank group 26 and the second air tank group 23 store the compressed air from the electric air compressor, which is used to drive the braking system and the power door system. According to one embodiment, the first air tank group 26 and the second air tank group 23 are arranged so that the pipe or line between the electric air compressor and each of the first air tank group 26 and the second air tank group 23 are substantially shortened for ease of installation and improved efficiency.

The air conditioning system 1 comprises an air conditioner, a compressor, and an inverter, which form an integral structure secured to a central section at the top of the body 2. The air conditioning system 1 may be adopted to adjust the temperature within the electric bus.

The electric-hydraulic power steering system 13 comprises a hydraulic power steering gear fixed via a bracket to the chassis 20 under the floor of an operation area 14, where the driver operates the electric bus. The hydraulic power steering gear may be connected to the steering column through a transmission shaft and an angle converter. Thus, the steering wheel may be adjusted in four directions, thereby improving the maneuverability of the entire electric bus.

The front cabin 12 of the body 2 includes from left to right a data recorder, a centralized lubrication system, a defrosting evaporator, a multimedia system, an onboard terminal, and a front assistance controller.

The front axle 30 and the rear axle 29 are both suitable for low-floor implementation in buses. For example, the front axle 30 and the rear axle 29 may utilize ZF axles from ZF Friedrichshafen AG, including a disc-type brake. In addition, the electric bus includes two front wheels 11 and four rear wheels 9. An air suspension may be adopted to improve the comfortableness of the entire electric bus and reduce the damage to the pavement caused by the electric bus. A dual inner swing mechanism is used for each of the front passenger door 16 and rear passenger door 20. The number of seats in the electric bus is about 33. A distance between adjacent rows may be substantially 720 mm. The seats are arranged to increase capacity and improve the distribution of the axle loads. Thus, the electric bus uses a one-step low floor structure with a reasonable distance from the main floor of the electric bus to the ground level.

In summary and with reference to the drawings, the electric power assembly 7 provides power to the electric bus via a battery system, thereby driving the drive motor to rotate, which produces kinetic energy. The kinetic energy may be transmitted to the main gearbox 24 of the rear axle 29 and to drive the rear wheel 9 of the electric bus to rotate, thereby moving the electric bus.

Although explanatory embodiments have been shown and described, it would be appreciated by those skilled in the art that changes, alternatives, and modifications can be made in the embodiments without departing from spirit and principles of the disclosure. Such changes, alternatives, and modifications all fall into the scope of the claims and their equivalents.

What is claimed is:

1. An electric bus, comprising:
a body including a floor, a rear cabin, and two front wheel wells, the front wheel wells being disposed in a middle section of the body, the body further including a seat area having one or more seats arranged in one or more rows, the rear cabin being disposed behind a back row of the seats;
a chassis;
a battery system for providing electric power to the electric bus;
wherein, the battery system, comprising:
a first battery group disposed above the respective front wheel wells;
a second battery group disposed under the floor and proximate to an intermediate row of the seats;
a third battery group disposed under the floor and proximate to a back row of the seats and in the rear cabin behind the back row of seats; and
two battery assembly cabinets disposed above respective front wheel wells of the body, the battery assembly cabinets being disposed symmetrically with respect to a longitudinal center line of the body.

2. The electric bus of claim 1, wherein the first battery group includes a first set of battery packs and second set of battery packs stacked vertically in the respective battery assembly cabinets.

3. The electric bus of claim 1, wherein the floor includes a wheelchair area behind the front wheel well across from a front passenger door of the body;
the second battery group comprises a third set of battery packs and fourth set of battery packs that are secured to the chassis under the floor; and
the third set of battery packs are disposed under the floor between the front wheel well and a rear passenger door of the body;
the third set battery packs form a single-layer structure on the chassis; and
the fourth set of battery packs form a double-layer structure under the wheelchair area and a single-layer structure between the wheelchair area and the rear wheel well.

4. The electric bus of claim 3, further comprising a first air tank group and a second air tank group secured to the chassis , the first air tank group being secured to the chassis under the floor proximate to the wheelchair area, and the second air tank group being secured to the chassis on the side of the rear passenger door and behind the rear wheel well.

5. The electric bus of claim 4, wherein the first air tank group and second air tank group each form a single layer structure on the chassis.

6. The electric bus of claim 1, wherein the third battery group includes a fifth set of battery packs and sixth set of battery packs;
the fifth set of battery packs are secured at a bottom section of a rear cabin under the floor proximate to the back row of the seats; and
the sixth set of battery packs are fixed at the top of the rear cabin behind the back row of the seats; and
the sixth set of battery packs are stacked at the top of the rear cabin vertically.

7. The electric bus of claim 6, further comprising a high-voltage power distribution system disposed at the top of the sixth battery packs of the third battery group behind the back row of the seats.

8. The electric bus of claim 1, wherein the number of the battery packs in the first battery group, the number of the battery packs in the second battery group, and the number of the battery packs in the third battery group are substantially similar.

9. The electric bus of claim 1, further comprising an electric power assembly disposed across from a rear passenger door, wherein the electric power assembly includes a driving motor and an auto-transmission secured to the chassis across from the rear passenger door and behind a rear axle, and the electric power assembly is connected to an input shaft of a main gearbox of a rear axle via a transmission shaft.

10. The electric bus of claim 1, wherein the second battery group comprises a third set of battery packs and fourth set of battery packs;
the third set of battery packs and the fourth set of battery packs are secured via brackets to the chassis under the floor of intermediate rows of the seats.

11. The electric bus of claim 10, wherein the third set of battery packs are disposed under the floor of the seat area that is between a front wheel cap near a passenger door of the body and a rear passenger door.

12. The electric bus of claim 11, wherein the third set of battery packs form a single layer on the chassis.

13. The electric bus of claim 10, wherein the fourth set of battery packs are disposed between the front wheel well and the rear wheel well.

14. The electric bus of claim 10, wherein the floor including an opening for inspecting the second battery group.

15. The electric bus of claim 1, wherein each of the first, second, and third battery groups includes a power and temperature management unit.

16. An electric bus, comprising:
a body including a floor, a rear cabin, and two front wheel wells, the front wheel wells being disposed in a middle section of the body, the body further including a seat area having one or more seats arranged in one or more rows, the rear cabin being disposed behind a back row of the seats;
a chassis;
a battery system for providing electric power to the electric bus;
wherein, the battery system, comprising:
a first battery group disposed above the respective front wheel wells ;
a second battery group disposed under the floor and proximate to an intermediate row of the seats; and
a third battery group disposed under the floor and proximate to a back row of the seats and in the rear cabin behind the back row of seats,
wherein the third battery group includes a first set of battery packs and a second set of battery packs;
the first set of battery packs are secured at a bottom section of a rear cabin under the floor proximate to the back row of the seats; and
the second set of battery packs are fixed at the top of the rear cabin behind the back row of the seats and stacked at the top of the rear cabin vertically.

17. The electric bus of claim 16, wherein the rear cabin includes a panel for inspecting the third battery group.

18. The electric bus of claim 16, further comprising a power distribution system secured to the third battery group.

19. The electric bus of claim 18, further comprising a service switch disposed on the third battery group.

20. An electric bus, comprising:
a body including a floor, a rear cabin, and two front wheel wells, the front wheel wells being disposed in a middle section of the body, the body further including a seat area having one or more seats arranged in one or more rows, the rear cabin being disposed behind a back row of the seats;
a chassis;
a battery system for providing electric power to the electric bus;
wherein, the battery system, comprising:
a first battery group disposed above the respective front wheel wells;
a second battery group disposed under the floor and proximate to an intermediate row of the seats;
a third battery group disposed under the floor and proximate to a back row of the seats and in the rear cabin behind the back row of seats, and
an electric power assembly disposed across from a rear passenger door, wherein the electric power assembly includes a driving motor and an auto-transmission secured to the chassis across from the rear passenger door and behind a rear axle, and the electric power assembly is connected to an input shaft of a main gearbox of a rear axle via a transmission shaft.

* * * * *